US012650548B2

(12) United States Patent
Lee et al.

(10) Patent No.: US 12,650,548 B2
(45) Date of Patent: Jun. 9, 2026

(54) LIGHT GUIDE PLATE AND BACKLIGHT MODULE

(71) Applicant: DARWIN PRECISIONS CORPORATION, Hsinchu County (TW)

(72) Inventors: Ya-Ching Lee, Hsinchu County (TW); Hsiang-I Hu, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 249 days.

(21) Appl. No.: 18/522,257

(22) Filed: Nov. 29, 2023

(65) Prior Publication Data

US 2024/0369754 A1 Nov. 7, 2024

(30) Foreign Application Priority Data

May 3, 2023 (TW) ................................. 112116503

(51) Int. Cl.
*F21V 8/00* (2006.01)
(52) U.S. Cl.
CPC ......... *G02B 6/0016* (2013.01); *G02B 6/0051* (2013.01); *G02B 6/0053* (2013.01); *G02B 6/0088* (2013.01)
(58) Field of Classification Search
CPC .. G02B 6/0016; G02B 6/0051; G02B 6/0053; G02B 6/0088

USPC ........................................................... 385/129
See application file for complete search history.

(56) References Cited

U.S. PATENT DOCUMENTS

| | | | | | |
|---|---|---|---|---|---|
| 2014/0313769 | A1* | 10/2014 | Lin | ...................... | G02B 6/0053 |
| | | | | | 362/607 |
| 2023/0280521 | A1* | 9/2023 | Shiau | ................... | G02B 6/0043 |
| | | | | | 362/606 |
| 2024/0295685 | A1* | 9/2024 | Zhou | ..................... | G02B 6/0086 |

FOREIGN PATENT DOCUMENTS

| | | |
|---|---|---|
| CN | 101614839 A | 12/2009 |
| CN | 104280818 A | 1/2015 |
| CN | 210488029 U | 5/2020 |
| CN | 218630263 U | 3/2023 |
| TW | 201302464 A1 | 1/2013 |

* cited by examiner

*Primary Examiner* — Jerry M Blevins

(57) ABSTRACT

A backlight module includes a light-emitting element and a light guide plate. The light guide plate includes a first surface disposed opposite to the light-emitting element, a second surface and the third surface connected to opposite sides of the first surface. The second surface is provided with a plurality of light-scattering microstructures, and each of the light-scattering microstructures is provided with a body portion and an edge portion. The edge portion surrounds the body portion, and the body portion and the edge portion protrude from or are recessed into the second surface. The edge portion has a first height for protruding from the second surface, or a first depth for being recessed into the second surface, and the first height and the first depth range from 0.2 μm to 1.4 μm.

14 Claims, 6 Drawing Sheets

(a)                              (b)

(a)                              (b)

(a)                              (b)

100a

120a

LIGHT GUIDE PLATE AND BACKLIGHT MODULE

CROSS-REFERENCE TO RELATED APPLICATIONS

This application claims the benefit of Taiwanese Application No. 112116503, filed on May 3, 2023, which is hereby incorporated by reference for all purposes as if fully set forth herein.

FIELD OF THE INVENTION

The present invention relates to a light source module, in particular to a backlight module and a light guide plate adapted to the backlight module.

BACKGROUND OF THE INVENTION

A liquid crystal display is mainly constructed by the components such as a backlight module, a display panel and an outer frame, etc. According to different directions of light-emitting elements, the backlight module can be divided into an edge type backlight module and a direct type backlight module. Generally, the edge type backlight module may be configured with a light guide plate, and light-emitting elements are disposed at an edge of the light guide plate. The light guide plate can guide light beams generated by the light-emitting elements to be emitted from a light-emitting surface near the display panel, thereby forming a surface light source. In addition, a bottom surface, opposite to the light-emitting surface, of the light guide plate is further provided with light-scattering microstructures to uniformly reflect light beams incident to the bottom surface to the light-emitting surface.

However, in prior art, a die core of the light guide plate is mostly manufactured by laser processing, so a surface of the die core is melted by laser and a large amount of molten deposits are formed. After the molten deposits are solidified, the molten deposits are formed on the light guide plate together with the light-scattering microstructures in the subsequent manufacturing process, thus destroying reflection paths and refraction paths of light beams. In this way, a large amount of large-view-angle stray light is emitted from a conventional light guide plate, resulting in difficulty in concentrating the light-emitting viewing angles of the edge-lit backlight module. In order to concentrate the light-emitting viewing angles, most of the conventional edge type backlight modules may be additionally configured with a lot of optical films, but due to the large number of optical films, the edge type backlight modules fail to be thinned, and the effect of concentrating the light-emitting view angles is quite limited.

SUMMARY OF THE INVENTION

The present disclosure provides a light guide plate to concentrate a range of light-emitting viewing angles and enhance light-emitting brightness.

The present disclosure provides a backlight module to concentrate a range of light-emitting viewing angles and enhance light-emitting brightness.

To achieve one or part or all of the above purposes or other purposes, a backlight module according to the present disclosure includes a light-emitting element and a light guide plate. The light guide plate includes a first surface, a second surface and a third surface. The first surface is opposite to the light-emitting element. The second surface and the third surface are connected to two opposite sides of the first surface, and the second surface and the third surface are opposite to each other. The second surface has a plurality of light-scattering microstructures, wherein each of the light-scattering microstructures has a body portion and an edge portion. The body portion is surrounded by the edge portion, and the body portion and the edge portion protrude from or are recessed into the second surface. The edge portion has a first height protruding from the second surface or a first depth recessed into the second surface, and the first height and the first depth range from 0.2 μm to 1.4 μm.

In one embodiment of the present disclosure, the body portion, for example, protrudes from the second surface, and the edge portion may be recessed into the second surface. The edge portion may further have a bottom portion, an inner side surface and an outer side surface. The inner side surface is opposite to the outer side surface, and the bottom portion is located between the inner side surface and the outer side surface. The inner side surface is connected to the body portion, and the outer side surface is connected to the second surface. In a normal direction of the second surface, a distance between the bottom portion and the second surface is the first depth.

In one embodiment of the present disclosure, the body portion may have a top portion protruding from the second surface. The body portion, for example, further has a second height between the second surface and the top portion in the normal direction of the second surface. The second height ranges from 3.8 μm to 24 μm.

In one embodiment of the present disclosure, the second surface may further have an imaginary surface. The imaginary surface extends to the body portion and penetrates through the body portion. A contour the body portion forming on the imaginary surface is circular, and a diameter of the contour of the body portion ranges from 17.3 μm to 30 μm.

In one embodiment of the present disclosure, the outer side surface of the edge portion may have a top edge, and the top edge is adjoined to the second surface. A contour the top edge forming on the second surface is circular, and a diameter of the contour of the top edge ranges from 21.22 μm to 32.4 μm.

In one embodiment of the present disclosure, the body portion, for example, is recessed into the second surface, and the edge portion may protrude from the second surface. The edge portion may further have a top portion, an inner side surface and an outer side surface. The inner side surface is opposite to the outer side surface, and the top portion is located between the inner side surface and the outer side surface. The inner side surface is connected to the body portion, and the outer side surface is connected to the second surface. In a normal direction of the second surface, a distance between the top portion and the second surface is the first height.

In one embodiment of the present disclosure, the outer side surface of the edge portion, for example, further has a bottom edge, and the bottom edge is adjoined to the second surface. The body portion may have a bottom portion recessed into the second surface. The body portion further has a second depth between the bottom edge and the bottom portion in the normal direction of the second surface. The second depth ranges from 3.8 μm to 24 μm.

In one embodiment of the present disclosure, the body portion, for example, has an opening, and the opening is located in the second surface. The second surface may further have an imaginary surface extending to the opening.

A contour the opening forming on the imaginary surface is circular, and a diameter of the contour of the opening ranges from 17.3 μm to 30 μm.

In one embodiment of the present disclosure, the outer side of the edge portion, for example, may be provided with a bottom edge, and the bottom edge is adjacent to the second surface. The bottom edge forms a circular contour on the second surface, and a diameter of the contour of the bottom edge ranges from 21.22 μm to 32.4 μm.

According to one embodiment of the present disclosure, the first height and the first depth, for example, range from 0.26 μm to 1.34 μm.

In one embodiment of the present disclosure, the backlight module may further include an inverse prism sheet, and the inverse prism sheet is disposed opposite to the third surface of the light guide plate.

In one embodiment of the present disclosure, the backlight module may further include a reflective sheet, and the reflective sheet is disposed opposite to the second surface of the light guide plate.

In one embodiment of the present disclosure, the backlight module may further include a first diffuser sheet, a second diffuser sheet, a first prism sheet and a second prism sheet. The first diffuser sheet is disposed opposite to the third surface of the light guide plate. The first prism sheet is disposed on a side of the first diffuser sheet facing away from the light guide plate. The second prism sheet is disposed on a side of the first prism sheet facing away from the light guide plate. The second diffuser sheet is disposed on a side of the second prism sheet facing away from the light guide plate.

To achieve one or part or all of the above purposes or other purposes, the present disclosure further provides the above light guide plate.

The light guide plate according to the present disclosure uses the light-scattering microstructures having the small-size edge portions to reduce the stray light in the large viewing angle, so that the light guide plate according to the present disclosure can concentrate the range of the light-emitting viewing angles and enhance the light-emitting brightness. The backlight module according to the present disclosure uses the light guide plate, so the backlight module can concentrate the range of the light-emitting viewing angles and enhance the light-emitting brightness.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
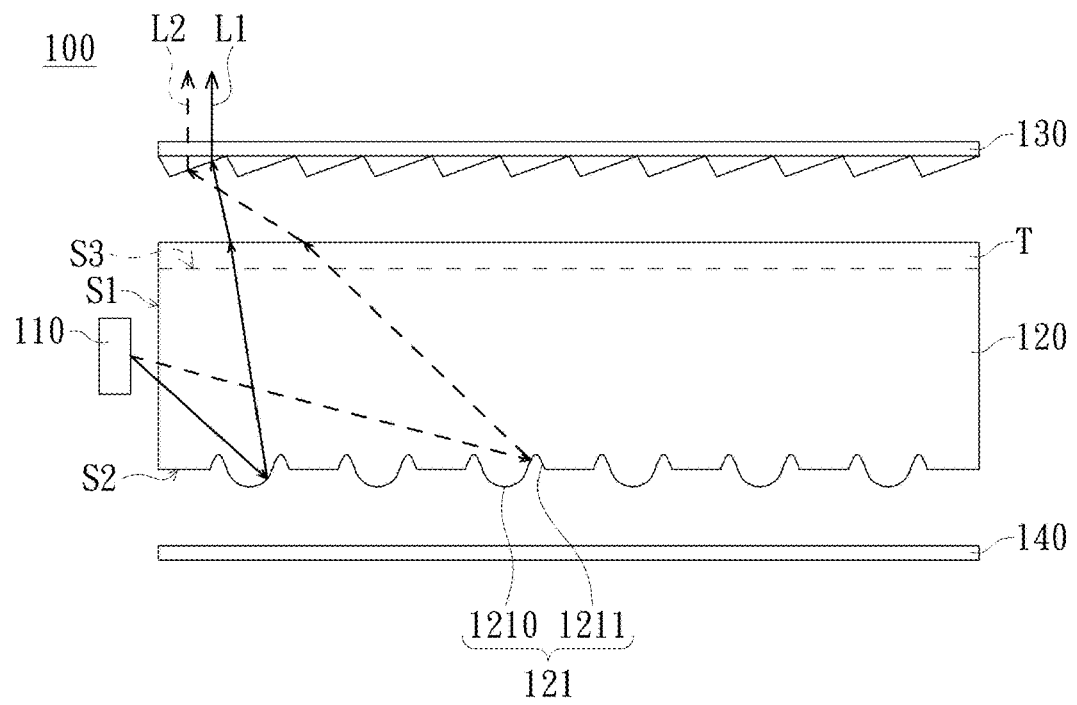
FIG. 1 is a schematic diagram of a backlight module according to an embodiment of the present disclosure.
Figure 2:
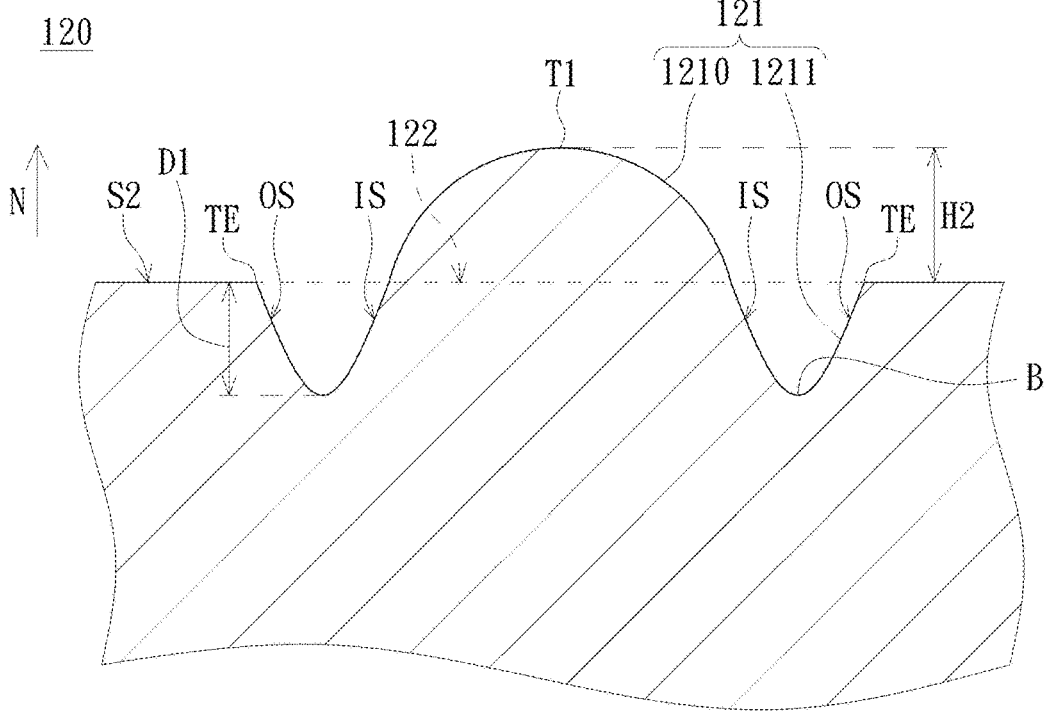
FIG. 2 is a schematic enlarged diagram of a light-scattering microstructure of a light guide plate in FIG. 1.
Figure 3:
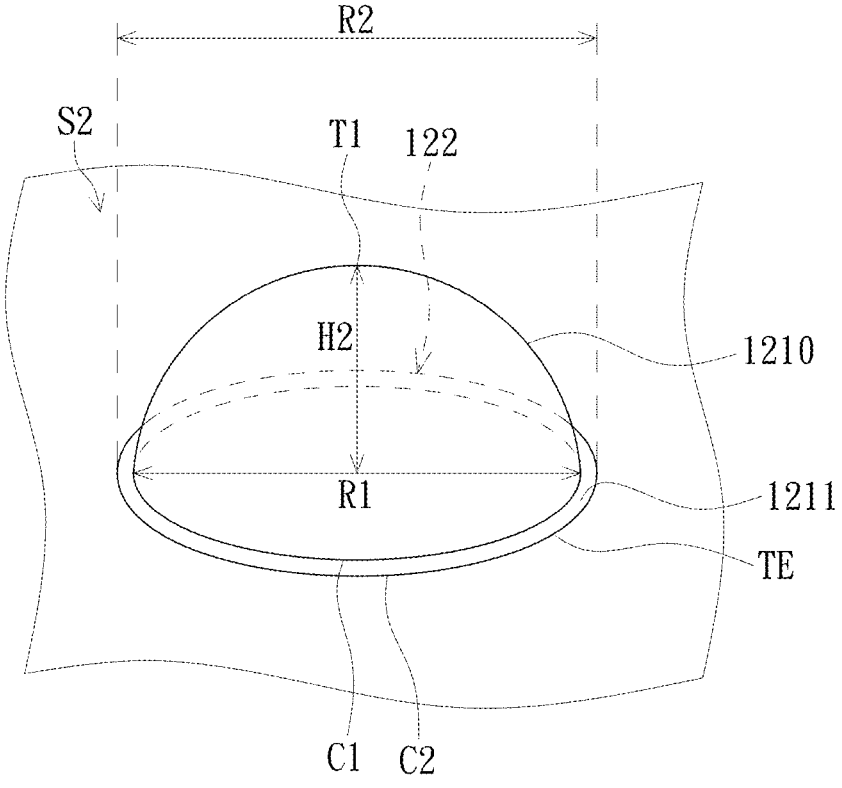
FIG. 3 is a schematic stereoscopic diagram of a light-scattering microstructure of a light guide plate in FIG. 1.
Figure 7:
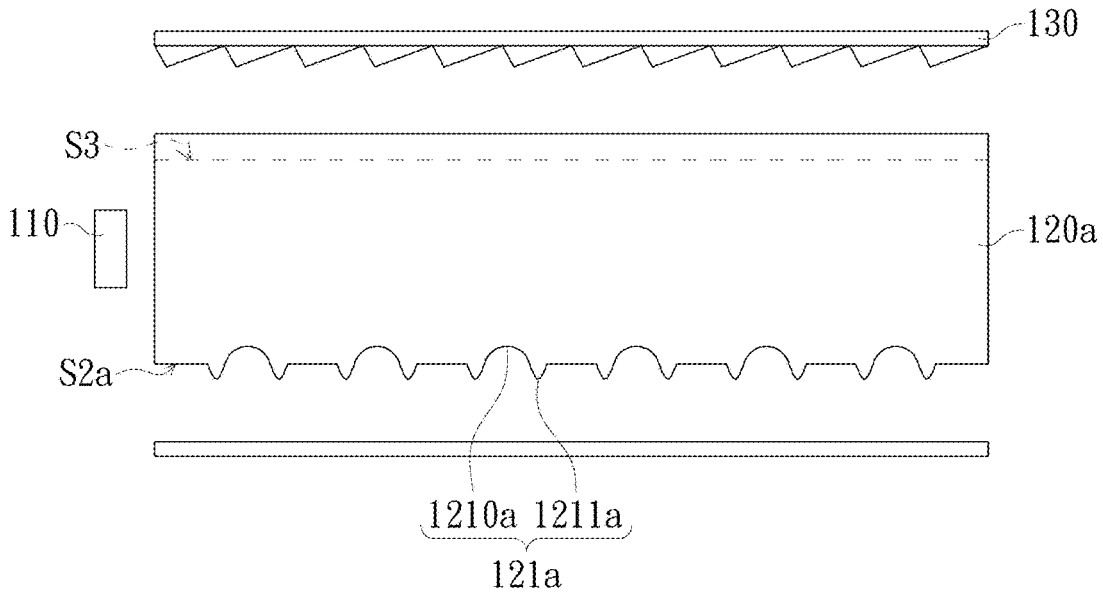
FIG. 7 is a schematic diagram of a backlight module according to an embodiment of the present disclosure.

FIG. 1 is a schematic diagram of a backlight module according to an embodiment of the present disclosure. FIG. 2 is a schematic enlarged diagram of a light-scattering microstructure of a light guide plate in FIG. 1. FIG. 3 is a schematic stereoscopic diagram of the light-scattering microstructure of the light guide plate in FIG. 1. Referring to FIG. 1 and FIG. 2 firstly, a backlight module 100 includes a light-emitting element 110 and a light guide plate 120. The light guide plate 120 has a first surface S1, a second surface S2 and a third surface S3. The first surface S1 is disposed opposite to the light-emitting element 110. The second surface S2 and the third surface S3 are connected to two opposite sides of the first surface S1, and the second surface S2 and the third surface S3 are opposite to each other. The second surface S2 has a plurality of light-scattering microstructures 121, wherein each of the light-scattering microstructures 121 has a body portion 1210 and an edge portion 1211. The body portion 1210 is surrounded by the edge portion 1211, and the body portion 1210 and the edge portion 1211 protrude from or are recessed into the second surface S2. It should be noted that in this embodiment, the body portion 1210, for example, protrudes from the second surface S2, the edge portion 1211 can be recessed into the second surface S2, and the edge portion 1211 has a first depth D1 (shown in FIG. 2) recessed into the second surface S2. The first depth D1 ranges from 0.2 μm to 1.4 μm. In one embodiment, such as the backlight module 100a shown in FIG. 7 and FIG. 8, a body portion 1210a of a light-scattering microstructure 121a, for example, is recessed into a second surface S2a, and an edge portion 1211a can protrude from the second surface S2a. The edge portion 1211a has a first height H1 (shown in FIG. 8) protruding from the second surface S2a, and the first height H1 ranges from 0.2 μm to 1.4 μm. It should be noted that in FIG. 1, in order to clearly represent the body portion 1210 and the edge portion 1211, a size ratio of the light-scattering microstructure 121 to the light guide plate 120 is merely illustrative and is not intended to limit the present disclosure. Similarly, a size ratio of the light-scattering microstructure 121a to the light guide plate 120a in FIG. 7 is only illustrative.

Referring again to FIG. 1, the light-emitting element 110 of this embodiment may include a light-emitting diode, but in other embodiments, the light-emitting element 110 may also be other types of light-emitting element. In addition, in one embodiment, the light-emitting element 110 may be an unpackaged light-emitting chip cut from a wafer; for example, the light-emitting element 110 may be a light-emitting diode chip. For example, the light-emitting diode chip may be a grain-grade nitride light-emitting diode chip that emits blue light at a dominant wavelength, but the present disclosure is not limited thereto. In addition, the light-emitting elements 110 of this embodiment may be arranged in an array, and the number of the light-emitting elements 110 is not limited in the present disclosure.

In this embodiment, the first surface S1 of the light guide plate 120 may allow light beams generated by the light-emitting element 110 to be incident, and the light beams may be reflected to the third surface S3 by the light-scattering microstructures 121 of the second surface S2. In addition, the third surface S3 may allow the light beams to emit so as to form a surface light source. Further, the third surface S3 may have a prism column T to adjust an emitting angle of the light beams and increase the light emitting uniformity. However, the details of the third surface S3 are not limited in other embodiments. In this embodiment, among the light beams entering the light guide plate 120 via the first surface S1, a light beam L1, for example, enters the body portions 1210 of the light-scattering microstructures 121, and after the light beam L1 is reflected by the body portions 1210, the light beam L1 enters the third surface S3 at a small angle. On the other hand, a light beam L2, for example, enters the edge portions 1211 of the light-scattering microstructures 121, and after the light beam L2 is reflected by the edge portions 1211, the light beam L2 enters the third surface S3 at a large angle. Hence, the light beam L2 may be referred to as stray light. However, because the light guide plate 120 of this embodiment has the edge portion 1211 with a small recess depth (i.e., a second depth D2 in FIG. 2), the stray light in a large viewing angle may be effectively reduced, thereby concentrating light-emitting viewing angles of the light guide plate 120 and improving light-emitting brightness of the third surface S3.

Further, referring again to FIG. 2, the edge portion 1211 of the light guide plate 120 may further have a bottom portion B, an inner side surface IS, and an outer side surface OS. The inner side surface IS is opposite to the outer side surface OS, and the bottom portion B is located between the inner side surface IS and the outer side surface OS. The inner side surface IS is connected to the body portion 1210, and the outer side surface OS is connected to the second surface S2. In a normal direction N of the second surface S2, a distance between the bottom portion B and the second surface S2 is the first depth D1. In one embodiment, the first depth D1, for example, ranges from 0.26 μm to 1.34 μm to further reduce the stray light in the large viewing angle, thereby further concentrating the light-emitting viewing angles of the light guide plate 120. For example, in another embodiment, the first depth D1 may be approximately 0.55 μm, but the present disclosure is not limited thereto. Additionally, referring to FIG. 2 and FIG. 3 together, in this embodiment, the edge portion 1211 may be annular and surround the body portion 1210. Further, the inner side surface IS of the edge portion 1211, for example, is adjoined to the body portion 1210, and the outer side surface OS may be adjoined to the second surface S2, but these details are not limited in the present disclosure.

In this embodiment, the body portion 1210 may have a top portion T1 protruding from the second surface S2. The body portion 1210, for example, further has a second height H2 between the second surface S2 and the top portion T1 in the normal direction N (shown in FIG. 2) of the second surface S2. The second height H2, for example, ranges from 3.8 μm to 24 μm. In this way, there can be more light beams reflected to the third surface S3 by the body portion 1210, which causes more light beams to enter the third surface S3 at a small angle, thereby further concentrating the light-emitting viewing angles of the light guide plate 120. In one embodiment, the second height H2, for example, is approximately 10.3 μm, but the present disclosure is not limited thereto.

On the other hand, the second surface S2 may further have an imaginary surface 122. The imaginary surface 122 extends to the body portion 1210 and penetrates through the body portion 1210. Continuing to refer to FIG. 3, a contour C1 the body portion 1210 forming on the imaginary surface 122 is circular, and a diameter R1 of the contour C1 of the body portion 1210 may range from 17.3 μm to 30 μm. Therefore, there can be more light beams reflected to the third surface S3 by the body portion 1210, which causes more light beams to enter the third surface S3 at a small angle, thereby further concentrating the light-emitting viewing angles of the light guide plate 120. In one embodiment, the diameter R1, for example, is approximately 27.6 μm, but other embodiments are not limited thereto. Additionally, in other embodiments, the shape of the contour C1 of the body portion 1210 is not limited to a circle.

Referring again to FIG. 2 and FIG. 3 together, in this embodiment, the outer side surface OS of the edge portion 1211 may have a top edge TE, and the top edge TE is adjoined to the second surface S2. A contour C2 the top edge TE forms on the second surface S2 is circular, and a diameter R2 of the contour C2 of the top edge TE may range from 21.22 μm to 32.4 μm. In this way, the backlight module 100 of this embodiment may avoid the formation of stray light caused by excessive light beam reflected by the edge portion 1211. In one embodiment, the diameter R2 of the contour C2 of the top edge TE, for example, is approximately 27.6 μm, which, however, is not limited by the present disclosure. It is to be understood that, in other embodiments, the shape of the contour C2 of the body portion 1210 is not limited to a circle.

Referring again to FIG. 1, the backlight module 100 of this embodiment may further include an inverse prism sheet 130, and the inverse prism sheet 130 is disposed opposite to the third surface S3. Further, the inverse prism sheet 130 may further direct the light-emitting viewing angles to approximate forward light emitting, thereby further concentrating the range of the light-emitting viewing angles of the backlight module 100, and further enhancing light-emitting brightness of the backlight module 100. In this embodiment, the inverse prism sheet 130, for example, is in a plate manner, and a plurality of prism columns may be formed on a surface of the inverse prism sheet 130 facing the light guide plate 120, so as to direct light beams (such as the light beams L1 and L2) to approximate the forward light emitting, thereby effectively concentrating the range of the light-emitting viewing angles. In addition, because the backlight module 100 can direct the light-emitting viewing angles to approximate the forward light emitting by using one optical film (that is, the inverse prism sheet 130), the backlight module 100 also has the advantage of small thickness.

Additionally, the backlight module 100 may further include a reflective sheet 140, and the reflective sheet 140 is disposed opposite to the second surface S2, so that the light utilization of the backlight module 100 can be further increased. In this embodiment, a material of the reflective sheet 140 may include silver, but the present disclosure is not limited thereto.

Compared with the prior art, the light guide plate 120 of this embodiment uses the light-scattering microstructures 121 with the small-size edge portions 1211 to reduce the stray light in the large viewing angle, so that the light guide plate 120 can concentrate the range of the light-emitting viewing angles and enhance the light-emitting brightness. In addition, the backlight module 100 of this embodiment uses the inverse prism sheet 130 to direct the light-emitting viewing angles to approximate the forward light emitting, and the backlight module 100 also uses the reflective sheet 140 to increase the light utilization. Therefore, the backlight module 100 of this embodiment can effectively concentrate the range of the light-emitting viewing angles and enhance the light-emitting brightness. In addition, because the backlight module 100 of this embodiment can direct the light-emitting viewing angles to approximate the forward light emitting by using one optical film (such as the inverse prism sheet 130), the backlight module 100 of this embodiment also has the advantage of small thickness. In addition, the backlight module 100 of this embodiment can concentrate the range of the light-emitting viewing angles and enhance the light-emitting brightness by using the light guide plate 120.

Figure 4:
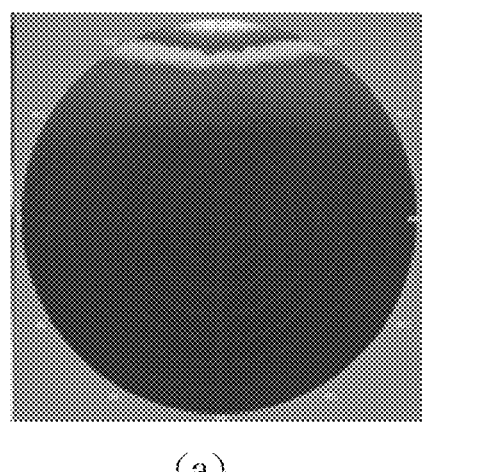
FIG. 4 is schematic diagrams of a light-emitting viewing angle of a conventional light guide plate and a light guide plate according to an embodiment of the present disclosure.
Figure 5:
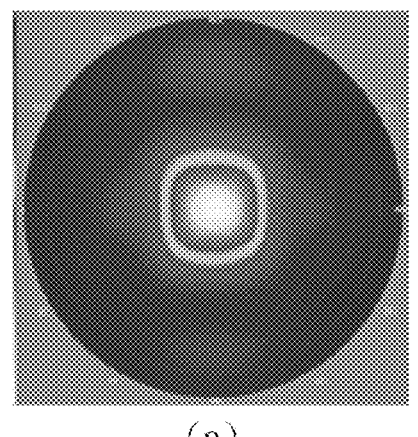
FIG. 5 is schematic diagrams of a light-emitting viewing angle of a conventional backlight module and a backlight module according to an embodiment of the present disclosure.
Figure 5:
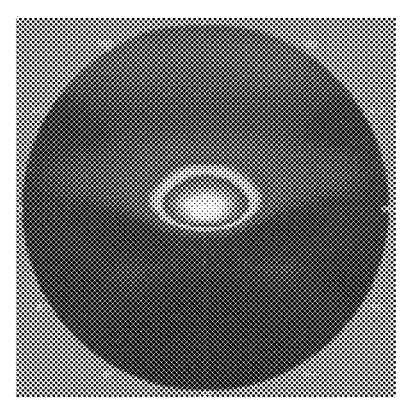

FIG. 4 is schematic diagrams of a light-emitting viewing angle of a conventional light guide plate and the light guide plate according to an embodiment of the present disclosure. FIG. 5 is schematic diagrams of a light-emitting viewing angle of a conventional backlight module and the backlight module according to an embodiment of the present disclosure. Further, referring to FIG. 4 firstly, (a) is the schematic diagram of the light-emitting viewing angle of the conventional light guide plate, and (b) is the schematic diagram of the light-emitting viewing angle of the light guide plate according to an embodiment of the present disclosure. Apparently, compared with the range of the light-emitting viewing angle of the conventional light guide plate shown in (a), the range of the light-emitting viewing angle of the light guide plate according to an embodiment of the present disclosure shown in (b) is concentrated. Therefore, the light guide plate according to the present disclosure can effectively concentrate the light-emitting viewing angles, and then enhance the light-emitting brightness. Referring to FIG. 5, (a) is the schematic diagram of the light-emitting viewing angle of the conventional backlight module, and (b) is the schematic diagram of the light-emitting viewing angle of the backlight module according to an embodiment of the present disclosure. Similarly, compared with the range of the light-emitting viewing angle of the conventional backlight module shown in (a), the range of the light-emitting viewing angle of the backlight module according to an embodiment of the present disclosure shown in (b) is further concentrated. Therefore, the backlight module according to the present disclosure can effectively concentrate the light-emitting viewing angles, and then enhance the light-emitting brightness. In more detail, the horizontal viewing angle, vertical viewing angle and brightness of the conventional backlight module may be referred to Table 1 below, and the horizontal viewing angle, vertical viewing angle and brightness of the backlight module according to an embodiment of the present disclosure may be referred to Table 2 below.

TABLE 1

| Horizontal viewing angle, vertical viewing angle and brightness of the existing backlight module | | |
|---|---|---|
| Horizontal viewing angle | Vertical viewing angle | Brightness |
| Full width at half-maximum (FWHM) | 36.44 | 34.50 | 100% |

TABLE 2

| Horizontal viewing angle, vertical viewing angle and brightness of the backlight module according to an embodiment of the present disclosure | | |
|---|---|---|
| Horizontal viewing angle | Vertical viewing angle | Brightness |
| Full width at half-maximum (FWHM) | 33.21 | 22.83 | 130% |

Figure 6:
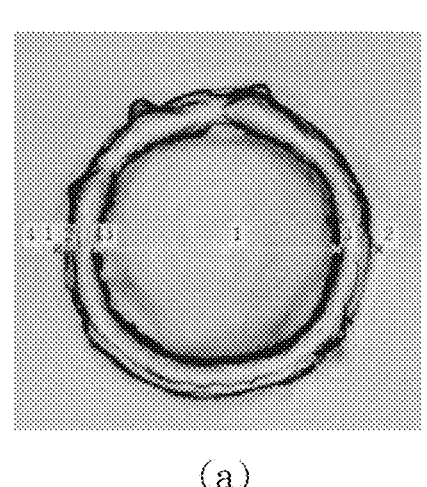
FIG. 6 is schematic diagrams of a conventional light-scattering microstructure and a light-scattering microstructure according to an embodiment of the present disclosure.
Figure 6:
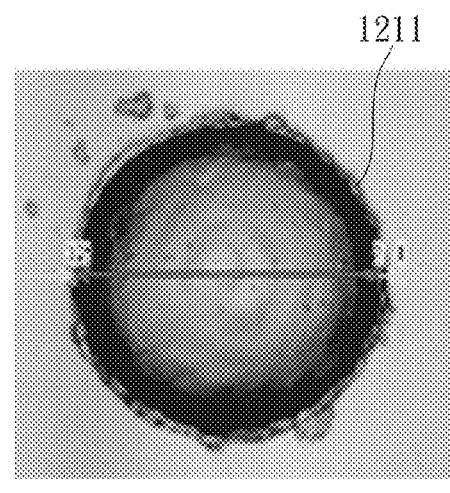

Additionally, referring again to FIG. 1, in one embodiment, a die core for manufacturing the light-scattering microstructures 121 may include a nickel-plated steel plate. Further, a nickel-plated surface of the nickel-plated steel plate may be processed by laser to form a complementary shape with the light-scattering microstructures 121. After a nickel layer of the nickel-plated steel plate is removed, a steel plate in a complementary shape with the light-scattering microstructures 121 can be formed, and the steel plate with the nickel layer removed can be used as the die core for the light-scattering microstructures 121. The die core may be used for manufacturing the light guide plate 100 by thermoforming or injection molding. In more detail, referring to FIG. 6, (a) is a schematic diagram of a light-scattering microstructure of a light guide plate manufactured by a conventional method, and (b) is a schematic diagram of the light-scattering microstructure of the light guide plate manufactured by the above method according to an embodiment of the present disclosure. Apparently, compared with the prior art, the method according to the present disclosure can effectively reduce the size of the edge portion 1211. It is to be understood that the above manufacturing method and the material of the die core are merely examples, and these details are not limited by the present disclosure.

Figure 8:
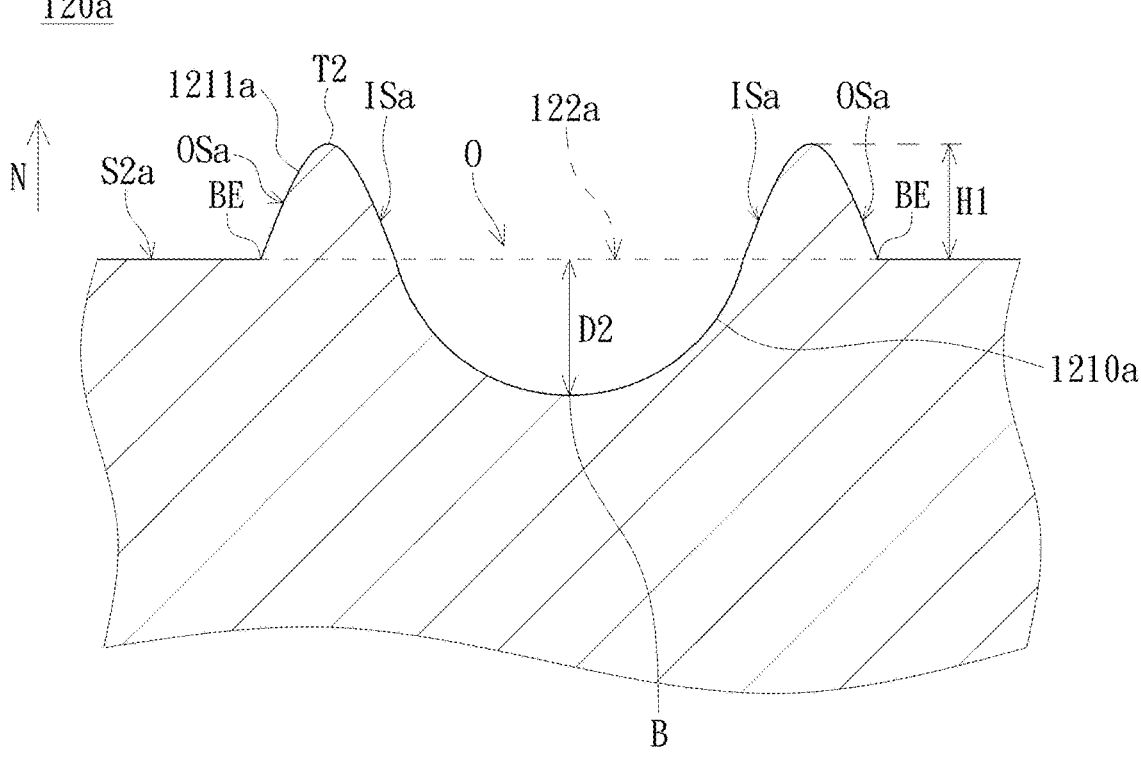
FIG. 8 is a schematic enlarged diagram of a light-scattering microstructure of a light guide plate in FIG. 7.
Figure 9:
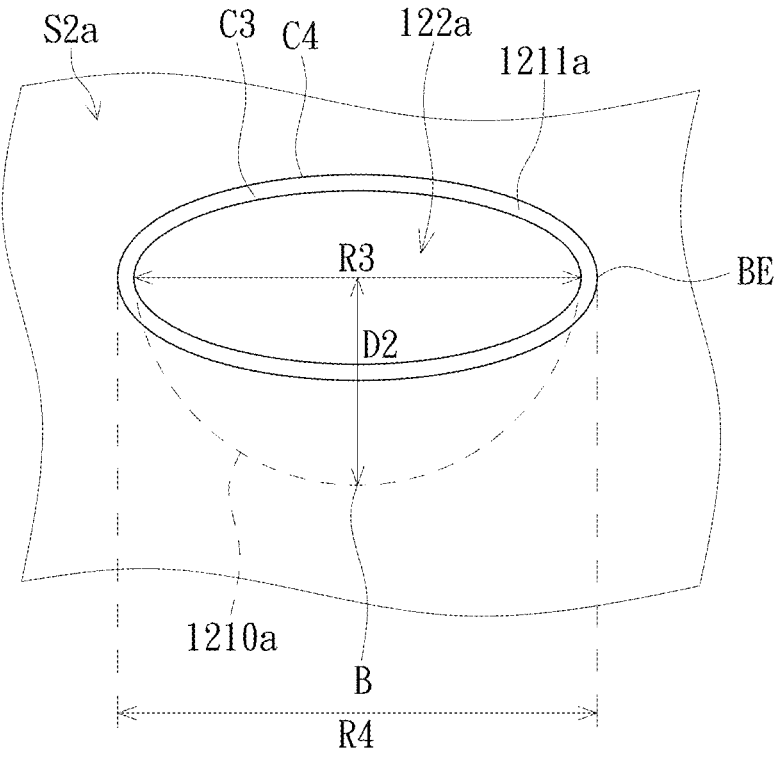
FIG. 9 is a schematic stereoscopic diagram of a light-scattering microstructure of a light guide plate in FIG. 7.

FIG. 7 is a schematic diagram of a backlight module according to an embodiment of the present disclosure. FIG. 8 is a schematic enlarged diagram of a light-scattering microstructure of a light guide plate in FIG. 7. FIG. 9 is a schematic stereoscopic diagram of the light-scattering microstructure of the light guide plate in FIG. 7. The structure and advantages of a backlight module 100a of this embodiment are similar to those of the embodiment in FIG. 1, and only the differences are explained below. Referring to FIG. 7 firstly, as mentioned above, a body portion 1210a of a light-scattering microstructure 121a may be recessed into a second surface S2a, and an edge portion 1211a may protrude from the second surface S2a. Referring to FIG. 8, the edge portion 1211a may be further provided with a top portion T2, an inner side surface ISa and an outer side surface OSa. The inner side surface ISa is opposite to the outer side surface OSa, and the top portion T2 is located between the inner side surface ISa and the outer side surface OSa. The inner side surface ISa is connected to the body portion 1210a, and the outer side surface OSa is connected to the second surface S2a. In a normal direction N of the second surface S2a, a distance between the top portion T2 and the second surface S2a is a first height H1. As mentioned above, the first height H1 ranges from 0.2 μm to 1.4 μm. In detail, in one embodiment, the first height H1, for example, ranges from 0.26 μm to 1.34 μm to further reduce stray light in a large viewing angle, thereby further concentrating light-emitting viewing angles of the light guide plate 120a. In another embodiment, the first height H1, for example, is approximately 0.55 μm, but the present disclosure is not limited thereto.

Referring to FIG. 8 and FIG. 9 together, in this embodiment, the outer side surface OSa (shown in FIG. 8) of the edge portion 1211a, for example, has a bottom edge BE, and the bottom edge BE is adjoined to the second surface S2a. The body portion 1210a may have a bottom portion B recessed into the second surface S2a. The body portion 1210a further has a second depth D2 between the bottom edge BE and the bottom portion B in the normal direction N (shown in FIG. 8) of the second surface S2a. The second depth D2 ranges from 3.8 μm to 24 μm. In this way, there can be more light beams reflected to the third surface S3 (shown in FIG. 7) by the body portion 1210a, which causes more light beams to enter the third surface S3 at a small angle, thereby further concentrating the light-emitting viewing angles of the light guide plate 120a (shown in FIG. 7). In one embodiment, the second depth D2, for example, is approximately 10.3 μm, but the present disclosure is not limited thereto.

On the other hand, the body portion 1210a of this embodiment, for example, has an opening O, and the opening O is located in the second surface S2a. The second surface S2a may further have an imaginary surface 122a extending to the opening O. A contour C3 (shown in FIG. 9) the opening O forming on the imaginary surface 122a is circular, and a diameter R3 of the contour C3 of the opening O may range from 17.3 μm to 30 μm. Therefore, there can be more light beams reflected to the third surface S3 (shown in FIG. 7) by the body portion 1210a, which causes more light beams to enter the third surface S3 at a small angle, thereby further concentrating the light-emitting viewing angles of the light guide plate 120a (shown in FIG. 7). In one embodiment, the diameter R3, for example, is approximately 27.6 μm, but other embodiments are not limited thereto. Additionally, in other embodiments, the shape of the contour C3 is not limited to a circle. It is to be noted that in this embodiment, the imaginary surface 122a, for example, extends from the second surface S2a and covers the opening O, and the imaginary surface 122a may be substantially parallel to the second surface S2a.

In addition, the bottom edge BE may be adjoined to the second surface S2a. A contour C4 (shown in FIG. 9) the bottom edge BE forming on the second surface S2a is circular, and a diameter R4 of the contour C4 of the bottom edge BE may range from 21.22 μm to 32.4 μm. In this way, the backlight module 100a may avoid the formation of stray light caused by excessive light beam reflected by the edge portion 1211a. In one embodiment, the diameter R4 of the contour C4 of the bottom edge BE, for example, is approximately 21.22 μm, which, however, is not limited by the present disclosure. It is to be understood that, in other embodiments, the shape of the contour C4 of the bottom edge BE is not limited to a circle.

Additionally, referring again to FIG. 7, in one embodiment, a die core for the light-scattering microstructures 121a may be manufactured by a transfer printing step. Further, the transfer printing step may be completed by two times of nickel plating, during which a nickel-plated steel plate and a nickel-plated nickel plate may be used. Firstly, a nickel-plated surface of the nickel-plated steel plate is processed by laser to form a concave portion recessed into the nickel-plated surface. After a nickel-plated nickel layer is removed, the steel plate may form the die core for the light-scattering microstructure 121a. After another nickel plating, the light-scattering microstructure 121a may be transferred to a nickel layer, and the above nickel-plated nickel plate may be used as the die core for the light-scattering microstructure 121a. In another embodiment, the light guide plate 100a may be manufactured by performing thermoforming or injection molding on the nickel-plated nickel plate, but a specific manufacturing process is not limited by the present disclosure. Additionally, in one embodiment, the thickness of the nickel layer of the nickel-plated nickel plate is larger than that of the nickel layer of the nickel-plated steel plate.

Figure 10:
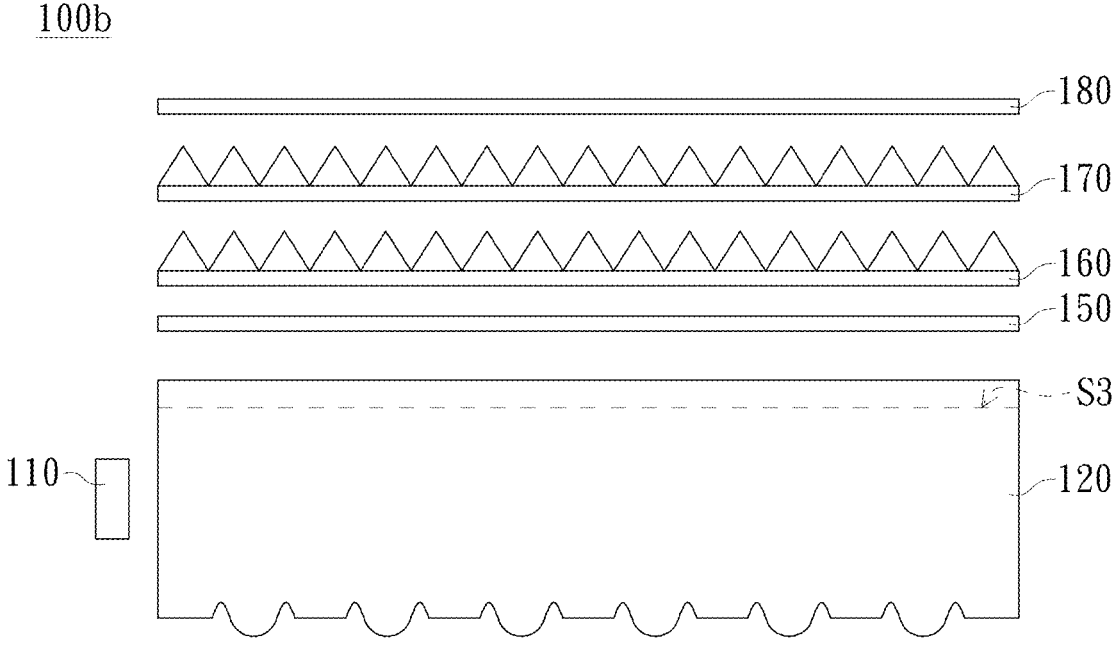
FIG. 10 is a schematic diagram of a backlight module according to an embodiment of the present disclosure.

FIG. 10 is a schematic diagram of a backlight module according to an embodiment of the present disclosure. The structure and advantages of a backlight module 100b of this embodiment are similar to those of the embodiment in FIG. 1, and only the differences are explained below. Referring to FIG. 10, the backlight module 100b may be not configured with the inverse prism sheet 130 and the reflective sheet 140 shown in FIG. 1. The backlight module 100b may further include a first diffuser sheet 150, a second diffuser sheet 160, a first prism sheet 170, and a second prism sheet 180. The first diffuser sheet 150 is disposed opposite to the third surface S3 of the light guide plate 120. The first prism sheet 170 is disposed on a side of the first diffuser sheet 150 facing away from the light guide plate 120. The second prism sheet 180 is disposed on a side of the first prism sheet 170 facing away from the light guide plate 120. The second diffuser sheet 160 is disposed on a side of the second prism sheet 180 facing away from the light guide plate 120. In this way, the range of light-emitting viewing angles of the backlight module 100b can be further concentrated, and the light-emitting brightness of the backlight module 100b can be enhanced. It is to be understood that, in other embodiments, an optical film configured by the backlight module 100b is not limited to the prism sheet or diffuser sheet, and the number of optical films is not limited by the present disclosure either.

In summary, the light guide plate according to the present disclosure uses the light-scattering microstructures having the small-size edge portions to reduce the stray light in the large viewing angle, so that the light guide plate according to the present disclosure can concentrate the range of the light-emitting viewing angles and enhance the light-emitting brightness. The backlight module according to the present disclosure uses the light guide plate, so the backlight module can concentrate the range of the light-emitting viewing angles and enhance the light-emitting brightness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A light guide plate, comprising:
   a first surface, a second surface, and a third surface, the second surface and the third surface connected to two opposite sides of the first surface, and the second surface and the third surface opposite to each other, the second surface having a plurality of light-scattering microstructures, wherein each of the light-scattering microstructures has a body portion and an edge portion, the body portion is surrounded by the edge portion, the body portion protrudes from the second surface, the edge portion is recessed into the second surface, the edge portion has a bottom portion, an inner side surface, an outer side surface, and a first depth being recessed into the second surface, the inner side surface is opposite to the outer side surface, the bottom portion is located between the inner side surface and the outer side surface, the inner side surface is connected to the body portion, and the outer side surface is connected to the second surface, in a normal direction of the second surface, a distance between the bottom portion and the second surface is the first depth, and the first depth ranges from 0.2 µm to 1.4 µm.

2. The light guide plate according to claim 1, wherein the body portion has a top portion protruding from the second surface, the body portion further has a second height between the second surface and the top portion in the normal direction of the second surface, and the second height ranges from 3.8 µm to 24 µm.

3. The light guide plate according to claim 1, wherein the second surface further has an imaginary surface, the imaginary surface extends to and penetrates through the body portion, a contour the body portion forming on the imaginary surface is circular, and a diameter of the contour of the body portion ranges from 17.3 µm to 30 µm.

4. The light guide plate according to claim 1, wherein the outer side surface of the edge portion has a top edge, the top edge is adjoined to the second surface, a contour the top edge forming on the second surface is circular, and a diameter of the contour of the top edge ranges from 21.22 µm to 32.4 µm.

5. The light guide plate according to claim 1, wherein the first height and the first depth range from 0.26 µm to 1.34 µm.

6. A light guide plate, comprising:

a first surface, a second surface, and a third surface, the second surface and the third surface connected to two opposite sides of the first surface, and the second surface and the third surface opposite to each other, the second surface having a plurality of light-scattering microstructures, wherein each of the light-scattering microstructures has a body portion and an edge portion, the body portion is surrounded by the edge portion, the body portion is recessed into the second surface, the edge portion protrudes from the second surface, the edge portion has a top portion, an inner side surface, an outer side surface, and a first height protruding from the second surface, the inner side surface is opposite to the outer side surface, the top portion is located between the inner side surface and the outer side surface, the inner side surface is connected to the body portion, and the outer side surface is connected to the second surface, in a normal direction of the second surface, a distance between the top portion and the second surface is the first height, and the first height ranges from 0.2 µm to 1.4 µm.

7. The light guide plate according to claim 6, wherein the outer side surface of the edge portion has a bottom edge, the bottom edge is adjoined to the second surface, the body portion has a bottom portion recessed into the second surface, the body portion further has a second depth between the bottom edge and the bottom portion in the normal direction of the second surface, and the second depth ranges from 3.8 µm to 24 µm.

8. The light guide plate according to claim 6, wherein the body portion has an opening, the opening is located in the second surface, the second surface further has an imaginary surface extending to the opening, a contour the opening forming on the imaginary surface is circular, and a diameter of the contour of the opening ranges from 17.3 µm to 30 µm.

9. The light guide plate according to claim 6, wherein the outer side surface of the edge portion has a bottom edge, the bottom edge is adjoined to the second surface, a contour the bottom edge forming on the second surface is circular, and a diameter of the contour of the bottom edge ranges from 21.22 µm to 32.4 µm.

10. A backlight module, comprising:

a light guide plate comprising a first surface, a second surface, and a third surface, the second surface and the third surface connected to two opposite sides of the first surface, and the second surface and the third surface opposite to each other, the second surface having a plurality of light-scattering microstructures, wherein each of the light-scattering microstructures has a body portion and an edge portion, the body portion is surrounded by the edge portion, the body portion protrudes from the second surface, the edge portion is recessed into the second surface, the edge portion has a bottom portion, an inner side surface, an outer side surface, and a first depth being recessed into the second surface, the inner side surface is opposite to the outer side surface, the bottom portion is located between the inner side surface and the outer side surface, the inner side surface is connected to the body portion, and the outer side surface is connected to the second surface, in a normal direction of the second surface, a distance between the bottom portion and the second surface is the first depth, and the first depth ranges from 0.2 µm to 1.4 µm; and a light-emitting element disposed opposite to the first surface of the light guide plate.

11. The backlight module according to claim 10, further comprising an inverse prism sheet, wherein the inverse prism sheet is disposed opposite to the third surface of the light guide plate.

12. The backlight module according to claim 11, further comprising a reflective sheet, wherein the reflective sheet is disposed opposite to the second surface of the light guide plate.

13. The backlight module according to claim 10, further comprising a first diffuser sheet, a second diffuser sheet, a first prism sheet and a second prism sheet, wherein the first diffuser sheet is disposed opposite to the third surface of the light guide plate, the first prism sheet is disposed on a side of the first diffuser sheet facing away from the light guide plate, the second prism sheet is disposed on a side of the first prism sheet facing away from the light guide plate, and the second diffuser sheet is disposed on a side of the second prism sheet facing away from the light guide plate.

14. A backlight module, comprising:

a light guide plate comprising a first surface, a second surface, and a third surface, the second surface and the third surface being connected to two opposite sides of the first surface, the second surface and the third surface being opposite to each other, the second surface having a plurality of light-scattering microstructures, wherein each of the light-scattering microstructures has a body portion and an edge portion, the body portion is surrounded by the edge portion, the body portion is recessed into the second surface, the edge portion protrudes from the second surface, the edge portion has a top portion, an inner side surface, an outer side surface, and a first height protruding from the second 5 surface, the inner side surface is opposite to the outer side surface, the top portion is located between the inner side surface and the outer side surface, the inner side surface is connected to the body portion, and the outer side surface is connected to the second surface, in 10 a normal direction of the second surface, a distance between the top portion and the second surface is the first height, and the first height ranges from 0.2 μm to 1.4 μm; and a light-emitting element disposed opposite to the first 15 surface of the light guide plate.

* * * * *